United States Patent [19]

Glöckler

[11] 4,294,217
[45] Oct. 13, 1981

[54] ELECTRICALLY CONTROLLED FUEL INJECTION APPARATUS

[75] Inventor: Otto Glöckler, Renningen, Fed. Rep. of Germany

[73] Assignee: Robert Bosch GmbH, Stuttgart, Fed. Rep. of Germany

[21] Appl. No.: 196,501

[22] Filed: Sep. 21, 1980

Related U.S. Application Data

[63] Continuation of Ser. No. 966,232, Dec. 4, 1978, abandoned.

[30] Foreign Application Priority Data

Jan. 26, 1978 [DE] Fed. Rep. of Germany ....... 2803266

[51] Int. Cl.$^3$ ............................................ F02M 23/10
[52] U.S. Cl. ..................................... 123/491; 123/588; 123/179 G; 251/11; 261/39 D
[58] Field of Search .......... 123/179 L, 179 G, 179 A, 123/180 T, 491, 494, 588, 585; 251/11; 261/39 D, DIG. 74

[56] References Cited

U.S. PATENT DOCUMENTS

| | | | |
|---|---|---|---|
| 3,500,634 | 3/1970 | Waseleski et al. | 251/11 |
| 3,964,457 | 6/1976 | Coscia | 123/32 EA |
| 4,137,871 | 2/1979 | Martel et al. | 123/32 EG |
| 4,143,621 | 3/1979 | Long | 123/32 EG |

FOREIGN PATENT DOCUMENTS 2211072 9/1973 Fed. Rep. of Germany ........ 123/32 EA

*Primary Examiner*—Charles J. Myhre
*Assistant Examiner*—Andrew M. Dolinar
*Attorney, Agent, or Firm*—Edwin E. Greigg

[57] ABSTRACT

An electrically controlled fuel injection apparatus is proposed which serves to control an internal combustion engine. The electrically controlled fuel injection apparatus comprises at least one injection valve which is opened via an electronic control apparatus in accordance with operational characteristics of the engine, at least one temperature-sensitive element which is in communication with the electronic control apparatus for the purpose of influencing the fuel injection quantity and one supplementary air valve disposed within a lateral channel which bypasses the throttle valve in the intake manifold, which supplementary air valve has a movable valve member which is actuatable against a return force by means of a member operating in accordance with temperature for the purpose of opening more or less widely the cross-sectional area of the lateral channel, whereby an electric heating device which is capable of being switched on when ignition impulses are present is attached to at least a portion of the temperature-dependent member, and the temperature-sensitive element is disposed within the supplementary air valve, in particular upon a bimetallic spring of the supplementary air valve which acts as the member which operates in dependence on temperature, for the purpose of influencing the fuel injection quantity. By means of this disposition of the temperature-sensitive element, a temperature-controlled and/or time-controlled enrichment of the fuel-air mixture takes place during the warm-up phase of the internal combustion engine.

9 Claims, 3 Drawing Figures

ELECTRICALLY CONTROLLED FUEL INJECTION APPARATUS This is a continuation, of application Ser. No. 966,232, filed Dec. 4, 1978, abandoned.

BACKGROUND OF THE INVENTION

The invention relates to an electrically controlled fuel injection apparatus of the type described in the Schwartz et al. application Ser. No. 963,711 filed Nov. 27, 1978, now U.S. Pat. No. 4,197,823. Such an apparatus is already known which has a temperature sensor which measures the coolant or cylinder head temperature for the purpose of controlling the enrichment of the fuel-air mixture during the warm-up phase of the internal combustion engine and in which the time control of the enrichment is carried out electronically. In order to increase the mixture quantity in this apparatus, a supplementary air valve is provided within a lateral channel which bypasses the throttle valve in the intake manifold. This supplementary air valve has a movable valve member which more or less widely opens the cross-sectional area of the lateral channel and is actuatable by means of a bimetallic spring against a return force. An electric heating device is attached at least partially to the bimetallic spring with this device being arranged to be switched on with the ignition of the internal combustion engine.

OBJECT AND SUMMARY OF THE INVENTION

The fuel injection apparatus in accordance with the invention has the advantage that in a simplified manner the expense for the attainment of a time control of the fuel enrichment during the warm-up phase of the engine can be substantially reduced and a supplemental housing for the temperature-sensitive element is not required.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
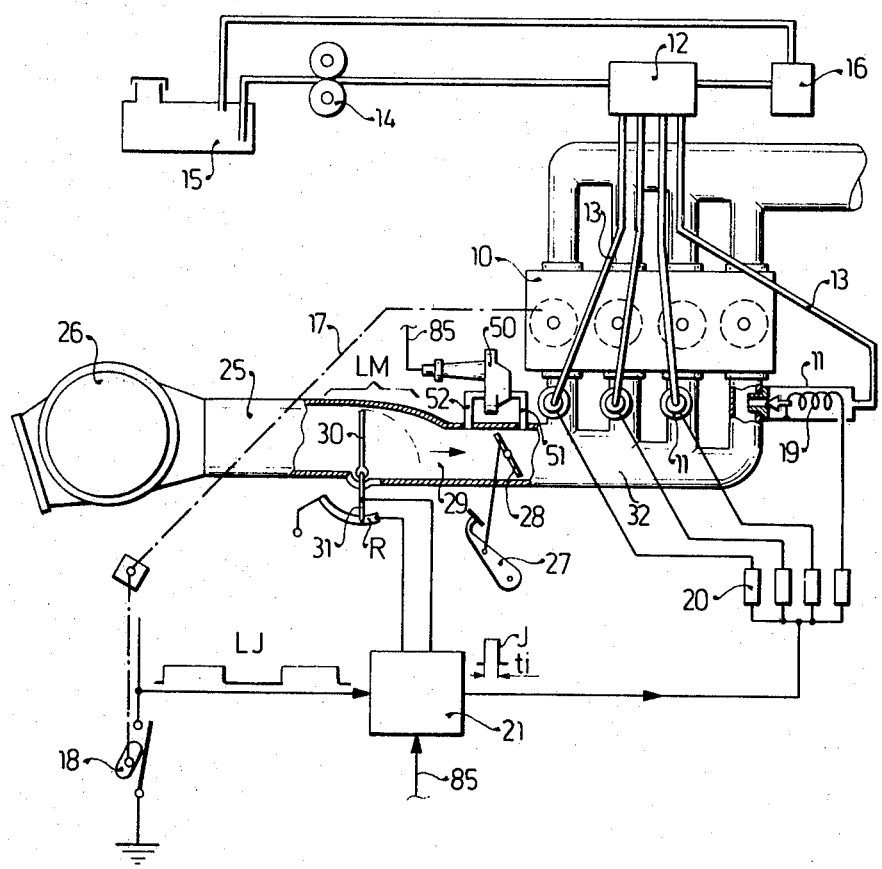
FIG. 1 shows in simplified form an electrically controlled fuel injection apparatus with a supplementary air valve.

The electrically controlled fuel injection system illustrated in FIG. 1 is intended for use with a four-cylinder, four-stroke internal combustion engine 10, and basically consists of four electromagnetically actuated injection vaves 11, to each of which the fuel to be injected is supplied by a distributor 12 via the respective conduit 13 of an electrically driven fuel pump 14. The fuel pump 14 pumps fuel from a fuel tank 15. The fuel is maintained at a constant fuel pressure by a pressure regulator 16. The injection valves 11 are also connected to an electronic controlling and regulating apparatus (to be described), which is triggered twice during each revolution of the engine's camshaft 17 by a signal generator 18 coupled to the camshaft 17. In each case, the apparatus delivers a corresponding square-wave shaped electrical opening pulse J for the injection valves 11. The time duration Ti of the opening pulses, illustrated in the drawing, determines the duration of the open state of the injection valves and, resultantly, that fuel quantity which leaves the interior of the injection vlaves 11, wherein an essentially constant pressure of 2 bar is maintained, during the particular given open state duration. The magnetic windings 19 of the injection valves 11 are each connected in series to a respective decoupling resistance 20, and thence connected to a common amplifier driver stage of an electronic control apparatus 21 containing at least one driver transistor whose emitter collector path completes the circuit via the respective series decoupling resistances 20 and the common connection of the magnetic valves 19.

In combustion engines of the depicted type, whose mixture is compressed and whose ignition is externally supplied, that specific fuel quantity is apportioned during each single suction stroke by the aspirated air quantity reaching each cylinder, which can be completely combusted during the subsequent power stroke. To obtain the optimal efficiency from the combustion engine, it is essential that no significant surplus of air remain present after the power stroke. In order to achieve the desired stoichiometric relationship between aspirated air and the fuel, an air quantity metering device LM, comprised essentially of a static plate 30 and a variable resistance R whose adjustable tap is linked to the static plate, is situated in the suction tube 25 of the intake manifold of the engine. The device LM is situated downstream of a filter 26 and upstream of the throttle valve 28. The position of the throttle valve 28 is manipulated by the accelerator pedal 27. The air quantity metering device LM cooperates with the electronic control apparatus 21, whose output stage delivers the injection pulses Ti.

The electronic control apparatus 21 contains two mutually cross-coupled, and hence alternately conducting feedback transistors, as well as an energy storage device, whose function may be embodied by a capacitor, or alternatively, by an inductor. The duration of the respective given discharging process of the energy storage device yields the opening duration Ti of the injection valves. To this end, the energy storage device must be charged, prior to each discharge, at a definite rate.

To assue that the given discharge duration contains the needed information regarding the given air quantity corresponding to the respective single suction stroke, the charging process is controlled by a charge switching circuit, represented in the illustrated embodiment by the signal generator 18. The signal generator 18 is actuated synchronously with the revolving motion of the crank-shaft 17, and serves to interconnect the energy storage device with the charging source during the charging pulse LJ, which lasts for and during a fixed, constant angular dispalcement of the crankshaft. During the charging pulse, the energy storage device delivers a given charging current. It is assumed for the present given case that the signal generator 18, which may in actual application consist of a bistable multivibrator respectively toggled to its complementary states by the ignition pulses, is switched off for an angular displacement of the crankshaft of 180 degrees, and is successively switched on for an equal angular displacement.

To overcome the increased frictional losses when starting from a cold state and during the warm-up phase of the internal combustion engine, it is necessary to supply supplemental air so that it bypasses the throttle valve 28 which is closed in the idling position and thus to supply a larger quantity of fuel mixture to the engine. This supplementary air is provided by means of a supplementary air valve 50 in a time-and/or temperature-dependent manner. The supplementary air valve 50, together with two air tubes 51 and 52, comprises a lateral channel for the purpose of bypassing the throttle valve 28 when it is closed during idling. For this purpose, the air tube 52 is attached upstream of the throttle valve to the suction tube section 29 between the static plate 30 and the throttle valve 28. The second air tube 51 permits the supplementary air to be introduced into the suction tube section 32 directly downstream from the throttle valve 28.

Figure 2:
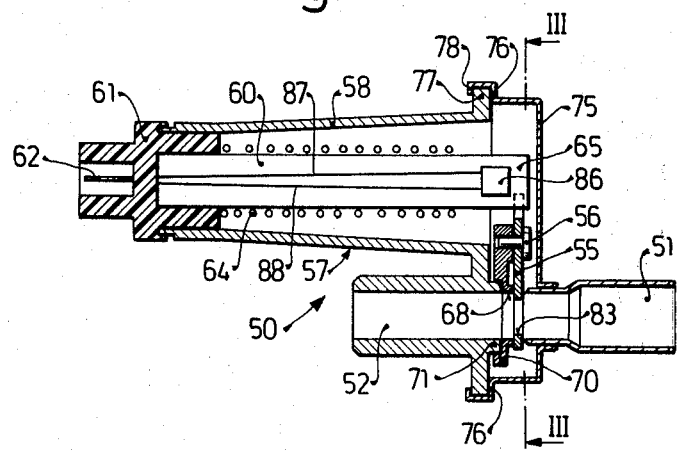
FIG. 2 shows a cross sectional view section through a supplementary air valve along the line II—II in FIG. 3.
Figure 3:
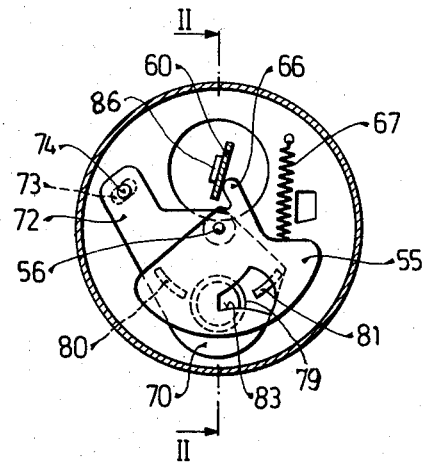
FIG. 3 shows a cross-sectional view section along the line III—III of FIG. 2.

As is shown in FIGS. 2 and 3, the supplementary air valve 50 has a flat vane 55 arranged to serve as a slider element which is pivotably disposed about an eccentrically placed axis embodied by a bearing tang 56. When vane 55 pivots it more or less widely uncovers or covers the inner diameters of the two air tubes 51 and 52, which are coaxial with respect to one another but disposed in spaced-apart relationship from each other as shown in FIG. 3. The air tube 52, which may be attached to the intake manifold by means of a rubber hose, not shown, is integrally connected with a housing 57 which has an elongated tapering neck portion 58.

An extended bimetallic spring 60 is disposed in the neck 58 and embedded in a plug element 61 inserted into the molded neck portion 58. The plug 61 contains prongs, of which only one is indicated in FIG. 2 with reference numeral 62. Two of the prongs are connected with the coil ends of a heating coil 64 which at least partially surround the bimetallic spring 60. The free end 65 of the bimetallic spring 60 contacts a short lever arm 66 which is formed on the vane 55 during stamping. The vane is pivoted by a tension spring 67, as is shown in FIG. 3, in a counterclockwise direction to such an extent that the lever arm 66 contacts the bimetallic spring 60.

Accordingly, when the heating coil 64 is switched on, which takes place only when ignition impulses are transmitted and heat is conducted to the bimetallic spring 60, the free end 65 of the bimetallic spring 60 does not press so strongly against the arm 66, so that the vane 55 is pivoted counterclockwise by means of the spring force. Thus, the vane 55 reduces the flow-through cross-section, which is defined by a bore 68, more and more, (see FIG. 3), so that the supplementary air is reduced to approximately zero by the time a normal engine operating temperature is reached.

For the purpose of setting the size of the flow-through cross-section, a bearing plate 70 is provided which is rotatably disposed on a collar 71 which is concentric with the air tube 52. This bearing plate 70 supports the bearing tang 56 for the vane 55, which tang 56 is pressed into the bearing plate 70. The bearing plate 70 has a laterally extending integral lever 72 formed thereon which lever includes a slotted bore 73, through which a locking screw 74 projects. When this screw is loosened, the bearing plate may be pivoted in the area of the slotted bore and then can be later fixed by tightening the screw. By this means, a simple setting and controlling capability for the vane 55 and the bimetallic spring 60 is provided. The supplementary air valve has a housing cap 75, into which air tube 51 is inserted. At its outer edge, the housing cap 75 is supported by a shoulder surface 76 on the flange-like rim 77 of the housing 57 and is fixed there by means of a flanged zone 78. The mass of the vane 55 as well as that of the bimetallic spring 60 are substantially equalized or balanced with respect to the bearing tang 56.

In order to avoid a lateral tipping of the vane 55, two arcuate guide ribs 80 and 81, generally shown in FIG. 3 with broken lines, are provided.

The flow-through cross-section between the two air tubes 51 and 52 at a given time is determined by the contour of a window 83, which is stamped out of the vane 55 to provide a configuration substantially as shown in FIG. 3. The window in the vane 55 is so disposed that when the heating of the bimetallic spring 60 is turned off and at equally low temperatures the window is arranged to lie across the inside diameter of the two air tubes 51 and 52. However, with increased warming and rotation of the bimetallic spring about its axis, it pivots away from lever arm 66 and thereby causes the vane 55 to rotate and reduce the quantity of air flowing through the window 83. It is thus to be understood from the foregoing that the shape of the window and its path of travel past the confronting surfaces of air tubes 51 and 52 is finely adjustable so that the pivoting angle of the vane 55 may not only be varied depending on the individual type of internal combustion engine, but it can be very precisely determined for engines of the same type and may additionally be adjusted to precise supplementary air quantities by means of the setting of the bearing plate 70.

The internal combustion engine during its warm-up phase requires not only a larger mixture quantity, but also a richer fuel-air mixture, in order to compensate for losses due to condensation in the intake manifold as well as in the combustion chambers. The required enrichment factor drops as the motor temperature increases. Accordingly, in an embodiment, it is sufficient to control this enrichment by simply depending on the operating temperature of the engine. When the demands on the internal combustion engine are greater, particularly when there is a requirement to meet stricter exhaust gas standards, the means of enrichment which is dependent on temperature is supplemented by a time-controlled enrichment. In accordance with the invention, it is proposed to provide a temperature-sensitive element in the supplementary air valve 50 which will measure the operating temperature of the engine and is connected with the electronic control apparatus 21 via an electrical line 85 for the purpose of influencing the quantity of fuel injected through the injection valves 11.

It is advantageous in particular that temperature-sensitive elements 86 embodied, for example, as pyroelectric conductors (NTC-resistor) are to be disposed on the bimetallic spring 60 of the supplementary air valve 50 as shown in FIGS. 2 and 3, so that the reduction of the mixture enrichment takes place in a temperature-and/or time-dependent manner in accordance with a function similar to the supplementary air control. The disposition of the temperature-sensitive element 86 in the supplementary air valve 50 thus makes it unnecessary to have a supplementary housing for the temperature-sensitive element and the additional expense which would be required to provide a further means of time control. The temperature-sensitive element 86 is connected via electrical lines 87, 88 with the prongs 62 of the plug 61 and from there with the electronic control apparatus 21 via the electrical line 85.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. An electrically controlled fuel injection apparatus for internal combustion engines comprising at least one electromagnetic injection valve which is controlled by an electronic control apparatus, a throttle valve in an intake manifold, one supplementary air valve disposed laterally within a housing and arranged to supply supplemental air so that the supplemental air bypasses said throttle valve in the intake manifold, said supplementary air valve having a movable valve member actuatable against a return force, an actuating means operating in dependence on temperature for actuating said movable valve member, an electrical heating device attached to at least a portion of said actuating means operating in dependence on temperature and capable of being switched ON in the presence of ignition impulses, a temperature-sensitive element secured on said actuating means within the supplementary air valve housing responsive to prevailing temperature within said supplementary air valve housing and the temperature of said actuating means and connected electrically with the electronic control apparatus to influence the fuel injection quantity.

2. A fuel injection apparatus in accordance with claim 1, further wherein said actuating means operating in dependence on temperature comprises a bimetallic spring.

3. A fuel injection apparatus in accordance with claim 2, further wherein said temperature-sensitive element is in thermal contact with said bimetallic spring of said supplementary air valve.

4. A fuel injection apparatus in accordance with claim 1, characterized in that a hot conductor resistor (NTC reistor) serves as said temperature-sensitive element.

5. A fuel injection apparatus in accordance with claim 2, characterized in that a hot conductor resistor (NTC resistor) serves as said temperature-sensitive element.

6. A fuel injection apparatus in accordance with claim 3, characterized in that a hot conductor resistor (NTC resistor) serves as said temperature-sensitive element.

7. An internal combustion engine comprising fuel injection means and a throttle device disposed in an intake manifold, means disposed in a passage in communication with said intake manifold which bypasses said throttle valve, said means including a supplementary air valve including a plug containing electric contact elements at one end thereof and a bimetallic spring in a plane transverse to said passage and about an axis that is located eccentrically relative to said passage at another end thereof, a blade member arranged to be pivotable under the action of said bimetallic spring, a heating coil associated with said bimetallic spring, and a temperature-sensitive element means disposed on said bimetallic spring and responsive to prevailing temperature in said supplementary air valve for influencing a fuel injection quantity, said temperature-sensitive element means being connected to electric contact elements in said plug, and said blade member arranged to at least partially block the cross-section of said bypass passage in dependence upon the temperature of said bimetallic spring.

8. An internal combustion engine in accordance with claim 7 in which said passage has a part that is defined by a pair of serially aligned, but longitudinally separated, air tubes having opposed end portions, said blade being at least partially disposed between the opposed end portions of said air tubes and having a window-like aperture therein adapted to provide a variable dimensioned air connection between said air tubes.

9. A supplementary air valve for use in an internal combustion engine having fuel injection and a throttle device disposed in an inlet manifold for controlling engine speed, said supplementary air valve being adapted to selectably bypass a throttle valve and comprising a pair of serially aligned, longitudinally separated air tubes having opposed end portions which together define at least part of a conduit connectable across the throttle valve of said engine, bimetallic spring means, said supplementary air valve further including a blade member arranged to be operated by said bimetallic spring means, said blade member having an aperture therein, which is arranged to be pivotable, under the action of said bimetallic spring means between the opposed ends of said tubes in a plane substantially transverse to the conduit and about an axis located eccentrically relative to said aperture and pyroelectric conductor means responsive to temperature in said supplementary air valve and disposed on said bimetallic spring.

* * * * *